April 15, 1924.
H. R. CARR
MOTOR VEHICLE HEADLAMP
Filed May 19, 1923
1,490,415
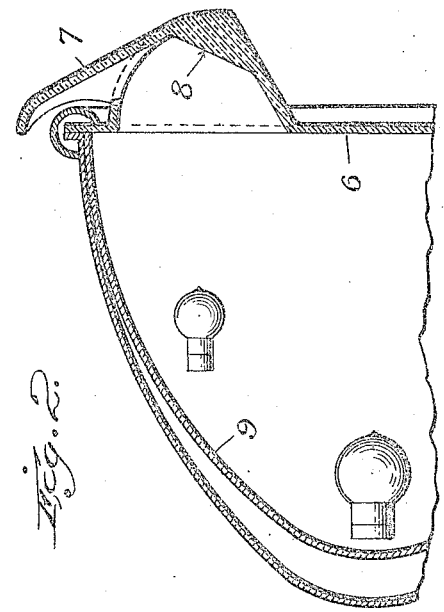
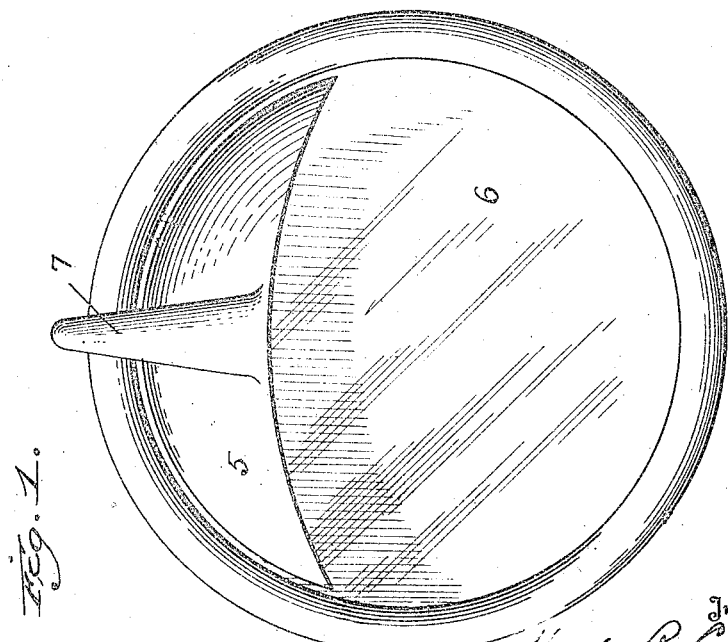
Inventor
Hugh R. Carr
By Davis & Davis
Attorney Patented Apr. 15, 1924.

1,490,415

UNITED STATES PATENT OFFICE.

HUGH R. CARR, OF PHILADELPHIA, PENNSYLVANIA.

MOTOR-VEHICLE HEADLAMP.

Application filed May 19, 1923. Serial No. 640,163.

*To all whom it may concern:*

Be it known that I, HUGH RODERICK CARR, a citizen of the United States of America, and a resident of Philadelphia, county of Philadelphia, and State of Pennsylvania, have invented certain new and useful Improvements in Motor-Vehicle Headlamps, of which the following is a full and clear specification.

The motor vehicle head-lamp visor is variously made, but in general it is molded in a single piece with the front-glass of the lamp. It is variously shaped and varies in its distance from front-glass to visor-tip, and from the upper rim of the lamp to the lower edge of the visor. This head-lamp visor has two purposes—to blank off a certain cross-section of the front-glass at the upper rim of the lamp to obstruct the light rays normally passing at an upward tangent from the reflector, and to deflect these rays downward toward the road surface. The head-lamp visor accomplishes both of these purposes. Incident, however, to the deflection of the light rays downward, there results an increase in the difficulty of determining, from the driver's seat in the car, the condition of the lights. The stray light-rays which, in the unvisored lamp, fall upon a nearby object (fender, hood, bumper) and thus disclose the condition of the lights and, in the visored lamp, either greatly or altogether deflected away from such objects. Under many conditions of twilight, smoke, haze, muffler-gas in traffic, bright nearby lights, it is practically impossible to determine from the driving seat of the car whether the lights are or are not burning even in the unvisored lamp; in the visored lamp the difficulty is much increased.

It is the purpose of my invention to provide means whereby the driver of the car, in his driving seat, may determine, at a glance, the condition of his lights, no matter what the shape or width or depth of the visor. This I accomplish by attaching to the visor a tell-tale which will pick up a ray of light from within the visor and deliver it to a point on the lamp or adjacent thereto, visible from the driving-seat of the car. Depending upon the shape of the visor, there will be several devices suitable for the purpose of my invention.

In the drawing—

Fig. 1 is a front elevation, and

Fig. 2 is a vertical sectional view of a headlight showing my invention applied thereto.

Referring to the drawing annexed by reference characters, 5 designates the visor of usual shape cast integral with the glass lens 6. Cast integral with the upper convex surface of the visor is an upstanding tube 7 whose lower end opens into the cavity of the visor through said top wall. Within the visor, at a point just below the open end of the tube 7 is a reflecting surface 8 set at an angle to reflect upwardly the rays from either the dimmer globe or the main globe located within the usual parabola reflecting shell 9.

The light rays from one or the other of the globes is reflected by the parabolic surface 9 onto the inclined mirrored surface 8 and thence are deflected upwardly into the tube 7, where they strike against the wall of the tube and are reflected backwardly out of the tube, over the top of the lamp. The inner surface of the tube 7 will be a reflecting surface, this reflecting surface being obtained by either placing a mirror therein or frosting the exterior surface of the glass tube. The reflecting surface 8 may be obtained either by a mirror or by frosting the outer surface of the visor wall or walls.

It will be observed from the foregoing that the invention consists in taking a beam of light from a point within the visor and delivering it to a point exterior of the lamp which is visible from the driving-seat of the car, this constituting the tell-tale of the condition of the lights within the car. It will be understood that I do not confine myself to the exact construction illustrated, as the same may be varied without departing from the spirit of the invention. For instance, it is not absolutely essential that the visor shall be molded integral with the lens, nor is it essential that the tell-tale reflecting tube be made integral with the visor.

What I claim is:

1. In a head-lamp for motor vehicles, a visor having within it a reflecting surface adapted to throw the rays upwardly, said visor also having a tell-tale reflecting surface exterior of the visor adapted to throw the rays rearwardly so as to be visible from the driver's seat.

2. A head-lamp for motor cars having a visor provided interiorly with a reflecting surface adapted to reflect the rays upwardly through an opening in the top wall thereof, said visor also having a tell-tale reflecting surface adapted to receive the rays from the aforesaid reflecting surface and reflect them rearwardly.

3. In a head-lamp for motor cars, a visor formed integral with the lens and having an opening in its top wall and an interior reflecting surface adapted to reflect the rays upwardly through said opening, and an integral member extending upwardly from said hole provided with a reflecting surface facing rearwardly.

4. In a head-lamp for motor cars, a lens having a visor whose top wall is provided with a light-emitting area and the interior of the visor being provided with a deflecting surface adjacent said area and inclined so as to reflect rays of light up through said area, said visor being also provided with an upstanding member adapted to receive the aforesaid upwardly-reflected rays of light and deflect them rearwardly over the top of the head-lamp.

In testimony whereof I hereunto affix my signature.

HUGH R. CARR.